United States Patent
Huang et al.

(10) Patent No.: US 8,958,762 B2
(45) Date of Patent: Feb. 17, 2015

(54) APPARATUS AND METHOD FOR POWER MANAGEMENT

(75) Inventors: Shih-Chao Huang, Taoyuan County (TW); Chien-Yen Li, Taoyuan County (TW); Chih-Wen Ko, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 385 days.

(21) Appl. No.: 13/415,383

(22) Filed: Mar. 8, 2012

(65) Prior Publication Data

US 2013/0238913 A1 Sep. 12, 2013

(51) Int. Cl.
*H04B 1/04* (2006.01)
(52) U.S. Cl.
USPC ............... 455/115.1; 455/126; 455/127.1
(58) Field of Classification Search
CPC .... H04B 1/1615; H04W 52/028; Y02B 60/50
USPC .......... 455/91, 102, 115.1, 115.2, 126, 127.1, 455/127.2, 127.3; 330/129, 149, 282; 232/274, 281, 282
See application file for complete search history.

(56) References Cited

U.S. PATENT DOCUMENTS

| | | | |
|---|---|---|---|
| 6,138,042 A | 10/2000 | Midya et al. | |
| 7,043,213 B2 | 5/2006 | Robinson et al. | |
| 2007/0178856 A1 | 8/2007 | Mitzlaff et al. | |
| 2010/0176885 A1 | 7/2010 | Kim et al. | |
| 2011/0298539 A1* | 12/2011 | Drogi et al. | 330/129 |
| 2013/0107769 A1 | 5/2013 | Khlat et al. | |
| 2013/0141062 A1* | 6/2013 | Khlat | 323/271 |
| 2013/0141068 A1* | 6/2013 | Kay et al. | 323/282 |
| 2013/0187711 A1 | 7/2013 | Goedken et al. | |

FOREIGN PATENT DOCUMENTS

EP 2 302 788 A1 3/2011

OTHER PUBLICATIONS

Stauth, Jason T et al.; "Dynamic Power Supply Design for High-Efficiency Wireless Transmitters" Technical Report No. UCB/EECS-2006-72, published on May 19, 2006, pp. 8-13.

* cited by examiner

*Primary Examiner* — Thanh Le
(74) *Attorney, Agent, or Firm* — Birch, Stewart, Kolasch & Birch, LLP (57) ABSTRACT

An apparatus for power management for use in a mobile device includes an RF (Radio Frequency) circuit, a power amplifier, a processor, and a DC to DC (Direct Current to Direct Current) converter. The processor is configured to generate a baseband signal. The RF circuit is configured to generate an RF signal according to the baseband signal. The power amplifier is configured to amplify the RF signal according to a supply voltage so as to generate an output signal. The processor is configured to detect an envelope of the RF signal, and to generate a control signal according to the envelope of the RF signal. The DC to DC converter operates in an APT (Average Power Tracking) mode or an ET (Envelope Tracking) mode so as to generate the supply voltage.

14 Claims, 7 Drawing Sheets

APPARATUS AND METHOD FOR POWER MANAGEMENT

BACKGROUND OF THE INVENTION

1. Field of the Invention

The disclosure generally relates to an apparatus for power management, and more particularly, relates to an apparatus for power management that can switch between an APT (Average Power Tracking) mode and an ET (Envelope Tracking) mode for use in a mobile device.

2. Description of the Related Art

In a traditional mobile device, a DC to DC (Direct Current to Direct Current) converter can control a power amplifier (PA) to operate in two power-saving modes. One is an APT (Average Power Tracking) mode, and the other is an ET (Envelope Tracking) mode. A system is designed to select only one of them, and cannot switch between them. In the APT mode, the mobile device discretely adjusts a supply voltage of the power amplifier. In the ET mode, the mobile device adjusts the supply voltage of the power amplifier according to a feedback RF (Radio Frequency) signal.

BRIEF SUMMARY OF THE INVENTION

The APT mode and the ET mode each have better performance within a unique range of output power. When output power of a mobile device is within a higher range, a DC to DC converter operating in the ET mode can make a power amplifier save more power. On the contrary, when output power of the mobile device is within a lower range, the DC to DC converter operating in the APT mode can make the power amplifier save more power. In order to combine advantages of both, there is a need to design a new apparatus for power management, thereby reducing power consumption of the power amplifier and optimizing standby time of the mobile device.

In one exemplary embodiment, the disclosure is directed to an apparatus for power management for use in a mobile device, comprising: a processor, generating a baseband signal; an RF (Radio Frequency) circuit, coupled to the processor, and generating an RF signal according to the baseband signal; a power amplifier, coupled to the RF circuit, and amplifying the RF signal according to a supply voltage so as to generate an output signal; and a DC to DC (Direct Current to Direct Current) converter, coupled between the processor and the power amplifier, and providing the supply voltage for the power amplifier, wherein: the processor is configured to detect an envelope of the RF signal, and to generate a control signal according to the envelope of the RF signal; and the DC to DC converter operates in an APT (Average Power Tracking) mode or an ET (Envelope Tracking) mode according to the control signal so as to generate the supply voltage.

In another exemplary embodiment, the disclosure is directed to a method for power management for use in a mobile device, comprising the steps of: generating a baseband signal by a processor; generating an RF (Radio Frequency) signal according to the baseband signal by an RF circuit; amplifying the RF signal according to a supply voltage so as to generate an output signal by a power amplifier; detecting an envelope of the RF signal and then generating a control signal according to the envelope of the RF signal by the processor; and operating in an APT (Average Power Tracking) mode or an ET (Envelope Tracking) mode according to the control signal so as to generate the supply voltage by a DC to DC (Direct Current to Direct Current) converter.

In one exemplary embodiment, the disclosure is directed to a mobile device, comprising: a battery, providing electrical power; an antenna; and an apparatus for power management, comprising: a processor, generating a baseband signal; an RF (Radio Frequency) circuit, coupled to the processor, and generating an RF signal according to the baseband signal; a power amplifier, coupled to the RF circuit, and amplifying the RF signal according to a supply voltage so as to generate an output signal; and a DC to DC (Direct Current to Direct Current) converter, coupled between the processor and the power amplifier, and providing the supply voltage for the power amplifier, wherein: the processor is configured to detect an envelope of the RF signal, and to generate a control signal according to the envelope of the RF signal; the DC to DC converter operates in an APT (Average Power Tracking) mode or an ET (Envelope Tracking) mode according to the control signal so as to generate the supply voltage; and the antenna is coupled to the apparatus for power management so as to transmit the output signal.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
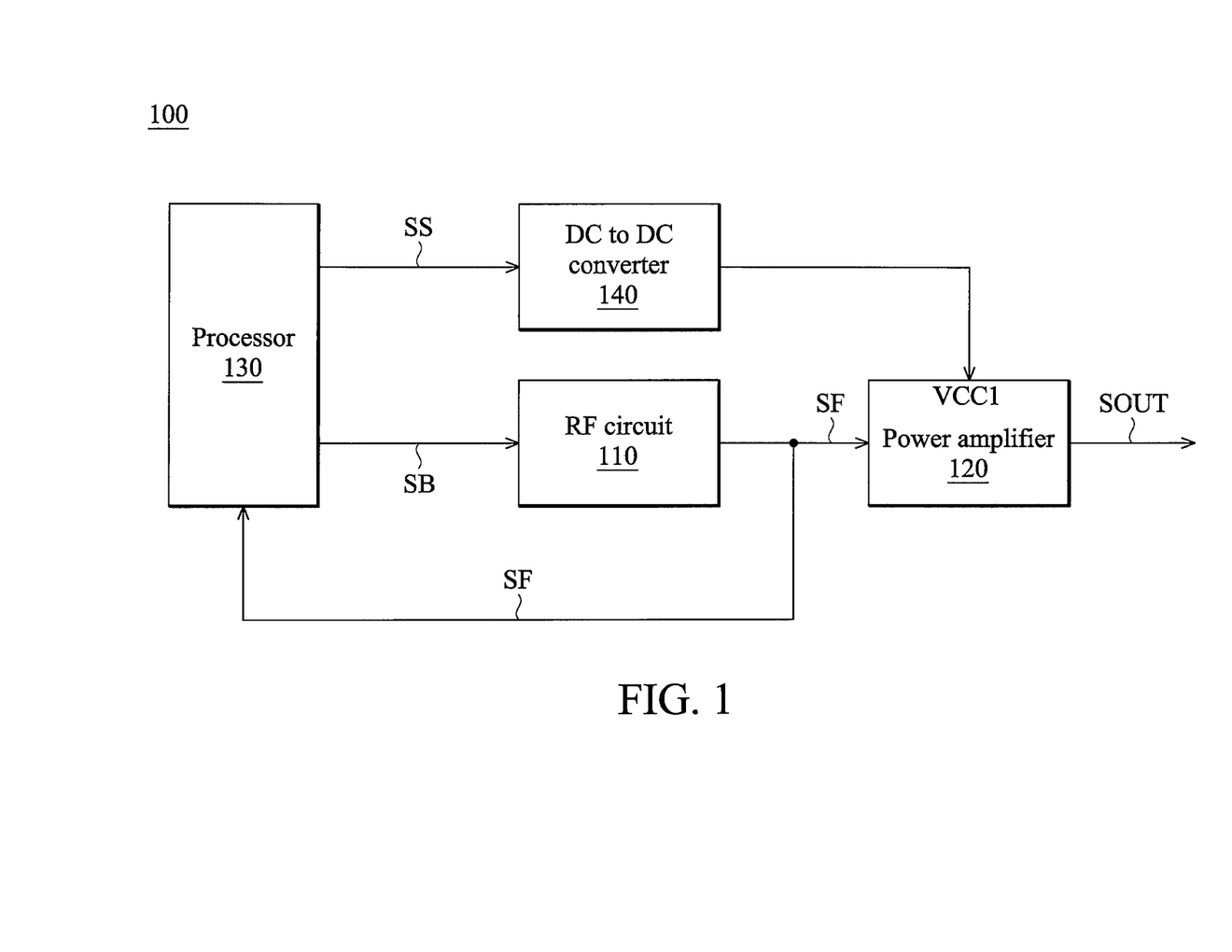
FIG. 1 is a diagram for illustrating an apparatus for power management according to an embodiment of the invention.

FIG. 1 is a diagram for illustrating an apparatus 100 for power management according to an embodiment of the invention. The apparatus 100 for power management may be applied to a mobile device, such as a mobile phone, a notebook, or a tablet PC. The apparatus 100 for power management comprises an RF (Radio Frequency) circuit 110, a power amplifier (PA) 120, a processor 130, and a DC to DC (Direct Current to Direct Current) converter 140.

The processor 130 is configured to generate a baseband signal SB. The RF circuit 110 is electrically coupled to the processor 130, and is configured to generate an RF signal SF according to the baseband signal SB, wherein the frequency of the RF signal SF is higher than that of the baseband signal SB. In an embodiment, the RF circuit 110 is a transceiver. The power amplifier 120 is electrically coupled to the RF circuit 110, and is configured to amplify the RF signal SF by a factor according to a supply voltage VCC1 so as to generate an output signal SOUT without distortion, wherein the supply voltage VCC1 is at a minimal, but sufficient, level. The processor 130 is configured to detect an envelope of the RF signal SF, and then configured to generate a control signal SS according to the envelope of the RF signal SF. The DC to DC converter 140 is electrically coupled between the processor 130 and the power amplifier 120. The DC to DC converter 140 provides the supply voltage VCC1 for the power amplifier 120. More particularly, the DC to DC converter 140 operates in either an APT (Average Power Tracking) mode or an ET (Envelope Tracking) mode according to the control signal SS so as to generate the supply voltage VCC1.

When operating in the ET mode, the DC to DC converter 140 dynamically adjusts the supply voltage VCC1 so as to make the power amplifier 120 amplify the RF signal SF without distortion, wherein the supply voltage VCC1 is at a minimal, but sufficient, level. The waveform of the supply voltage VCC1 is similar to that of the RF signal SF. On the other hand, when operating in the APT mode, the DC to DC converter 140 discretely adjusts the supply voltage VCC1.

Figure 2:
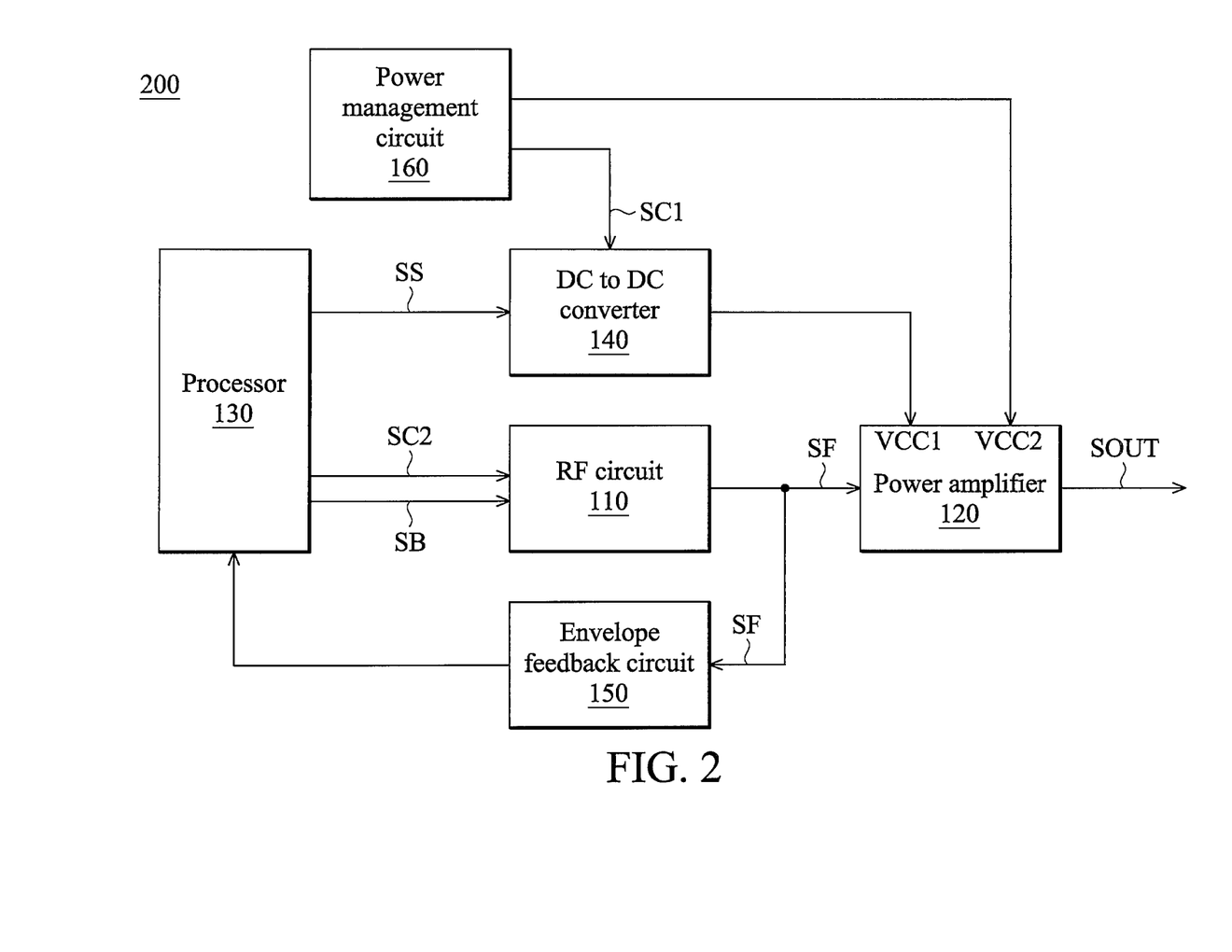
FIG. 2 is a diagram for illustrating an apparatus for power management according to another embodiment of the invention.

FIG. 2 is a diagram for illustrating an apparatus 200 for power management according to another embodiment of the invention. In the embodiment, the apparatus 200 for power management further comprises an envelope feedback circuit 150 and a power management circuit 160. The processor 130 receives the RF signal SF through the envelope feedback circuit 150. The envelope feedback circuit 150 processes the RF signal SF, and then transmits the processed RF signal SF to the processor 130. In some embodiments, the envelope feedback circuit 150 is an attenuator for attenuating the RF signal SF, thereby avoiding RF signals SF which have large magnitudes, which may damage the processor 130. The power management circuit 160 can generate a control signal SC1 and a bias voltage VCC2 so as to adjust the functions of the DC to DC converter 140 and the power amplifier 120, respectively. For example, the power management circuit 160 may turn on or turn off the DC to DC converter 140 by adjusting a supply voltage of the DC to DC converter 140, and/or may make the power amplifier 120 operate in a proper linear region by adjusting the bias voltage VCC2 of the power amplifier 120. The DC to DC converter 140 may provide the necessary supply voltage VCC1 so as to save power consumption of the mobile device. In addition, the processor 130 further generates a control signal SC2 so as to adjust the function of the RF circuit 110. For example, the processor 130 may initialize the RF circuit 110, and/or may adjust the frequency of the RF signal SF.

Figure 3:
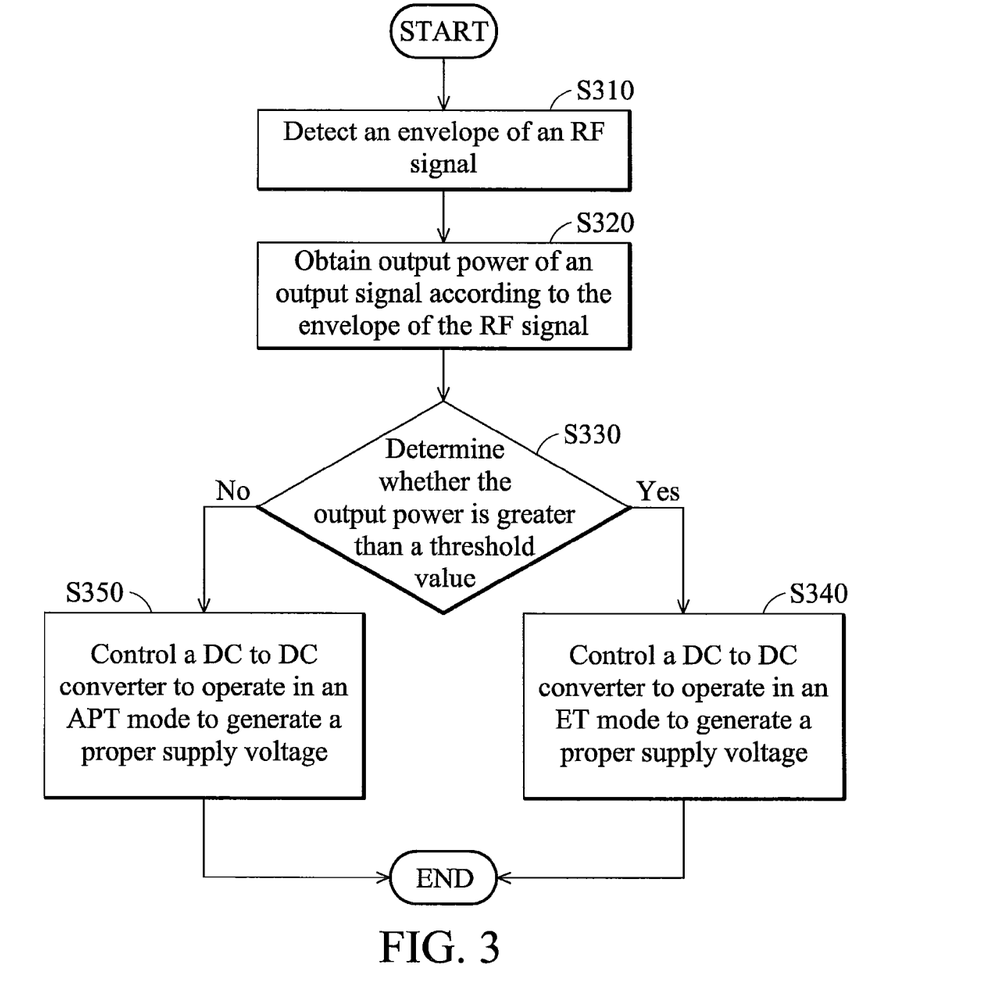
FIG. 3 is a flowchart for illustrating a selection procedure performed by a processor of the apparatus for power management according to an embodiment of the invention.

FIG. 3 is a flowchart for illustrating a selection procedure performed by the processor 130 of the apparatus for power management according to an embodiment of the invention. As shown in FIG. 3, steps S310-S350 are performed by the processor 130. In step S310, the processor 130 detects the envelope of the RF signal SF. In step S320, the processor 130 obtains the output power of the output signal SOUT according to the envelope of the RF signal SF. Note that since the factor of the power amplifier 120 is indirectly determined by the processor 130, the processor 130 is capable of calculating the output power of the current output signal SOUT according to the factor and the envelope of the RF signal SF. In step S330, the processor 130 determines whether the output power of the output signal SOUT is greater than a threshold value. If the output power is greater than the threshold value, in step S340, the processor 130 controls the DC to DC converter 140 to operate in the ET mode so as to generate the proper supply voltage VCC1, and then the power amplifier 120 amplifies the RF signal SF according to the supply voltage VCC1. If the output power is less than or equal to the threshold value, in step S350, the processor 130 controls the DC to DC converter 140 to operate in the APT mode so as to generate the proper supply voltage VCC1, and then the power amplifier 120 amplifies the RF signal SF according to the supply voltage VCC1. In other words, the processor 130 makes the DC to DC converter 140 select either the ET mode or the APT mode according to the output power of the output signal SOUT, and the DC to DC converter 140 accordingly provides the supply voltage VCC1 for the power amplifier 120. In an embodiment, the threshold value is set as 6 dBm.

Figure 4:
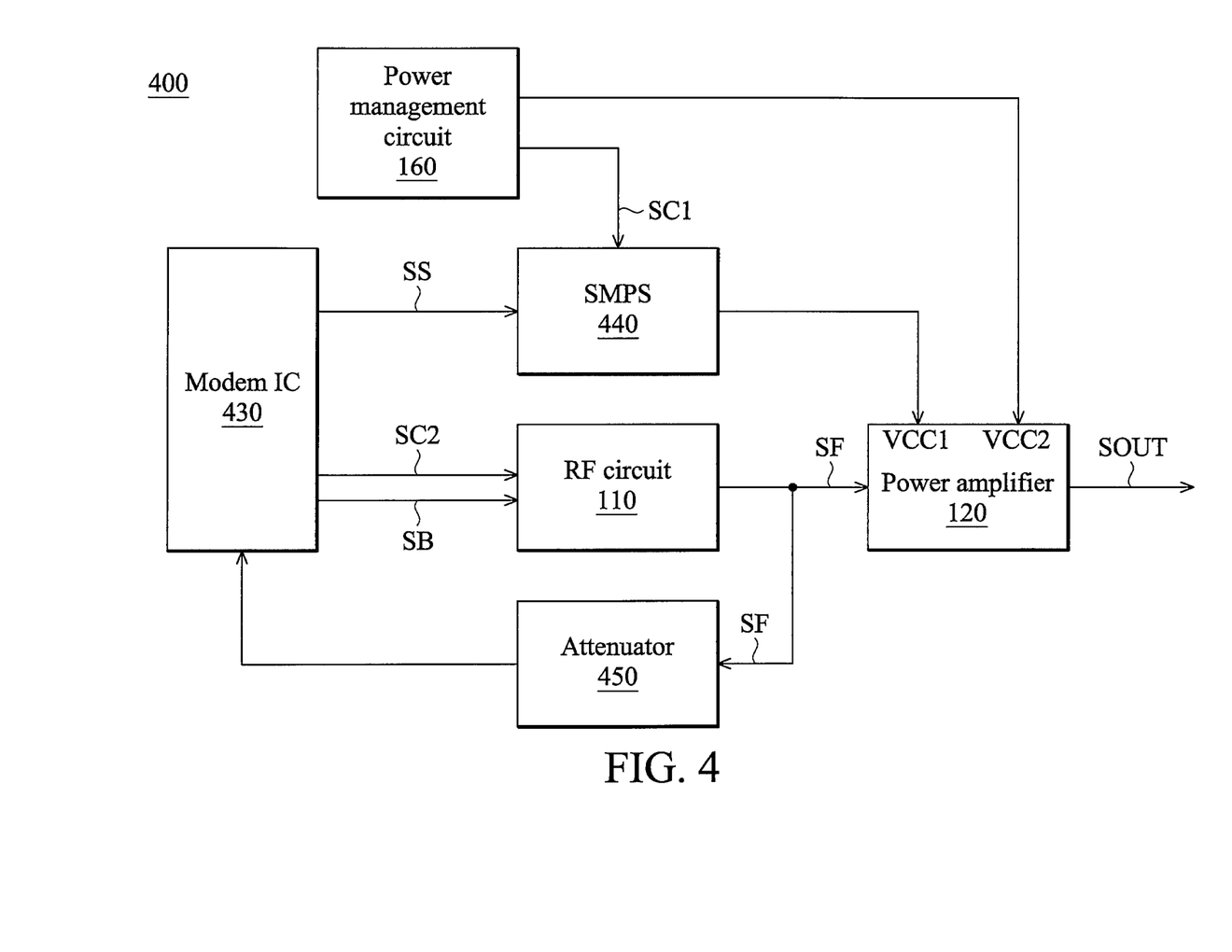
FIG. 4 is a diagram for illustrating an apparatus for power management according to an embodiment of the invention.

FIG. 4 is a diagram for illustrating an apparatus 400 for power management according to an embodiment of the invention. In a preferred embodiment, the processor is a modem IC (Integrated Circuit) 430, and the DC to DC converter is an SMPS (Switch Mode Power Supply) 440. Also, the envelope feedback circuit is an attenuator 450. The modem IC 430 selects operation modes of the SMPS 440 according to an envelope of the attenuated RF signal SF.

Figure 5A:
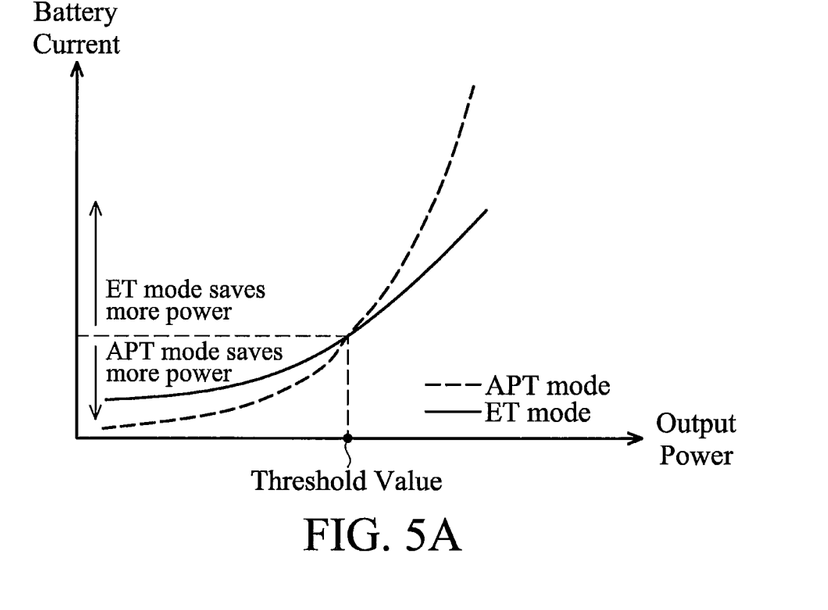
FIG. 5A is a diagram for illustrating battery currents in different operation modes.

FIG. 5A is a diagram for illustrating battery currents in different operation modes, wherein the horizontal axis represents output power of the output signal SOUT, and the vertical axis represents a battery current in a mobile device. As shown in FIG. 5A, when the output power of the output signal SOUT is less than or equal to a threshold value, consumption of the battery current in the APT mode is less than that in the ET mode, and when the output power of the output signal SOUT is greater than the threshold value, consumption of the battery current in the APT mode is greater than that in the ET mode. Therefore, a mobile device can save more power by switching between the two operation modes appropriately.

Figure 5B:
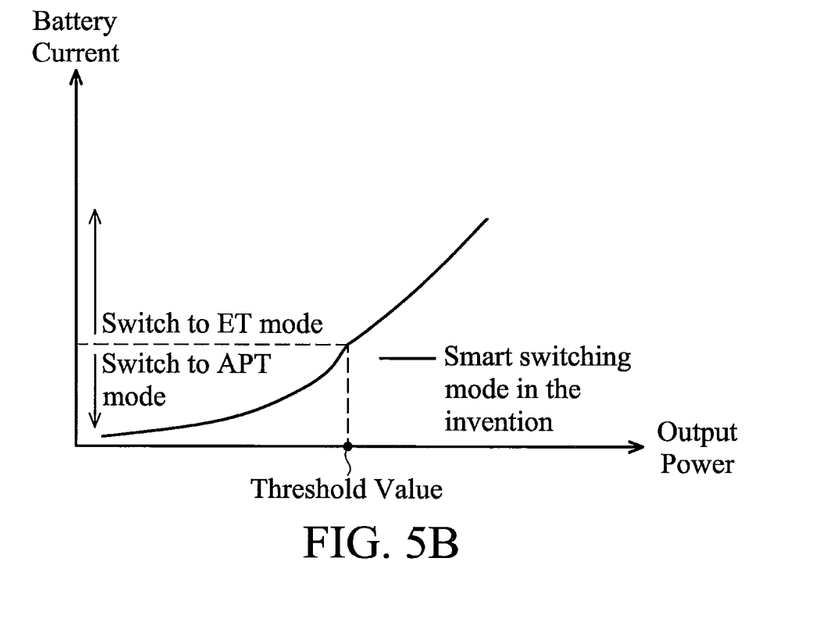
FIG. 5B is a diagram for illustrating a battery current in a smart switching mode according to an embodiment of the invention.

FIG. 5B is a diagram for illustrating a battery current in a smart switching mode according to an embodiment of the invention, wherein the horizontal axis represents output power of the output signal SOUT, and the vertical axis represents a battery current in a mobile device. As shown in FIG. 5B, in the invention, the DC to DC converter 140 is capable of switching between the ET mode and the APT mode according to whether the output power of the output signal is greater than the threshold or not, thereby saving more power in the mobile device.

Figure 6:
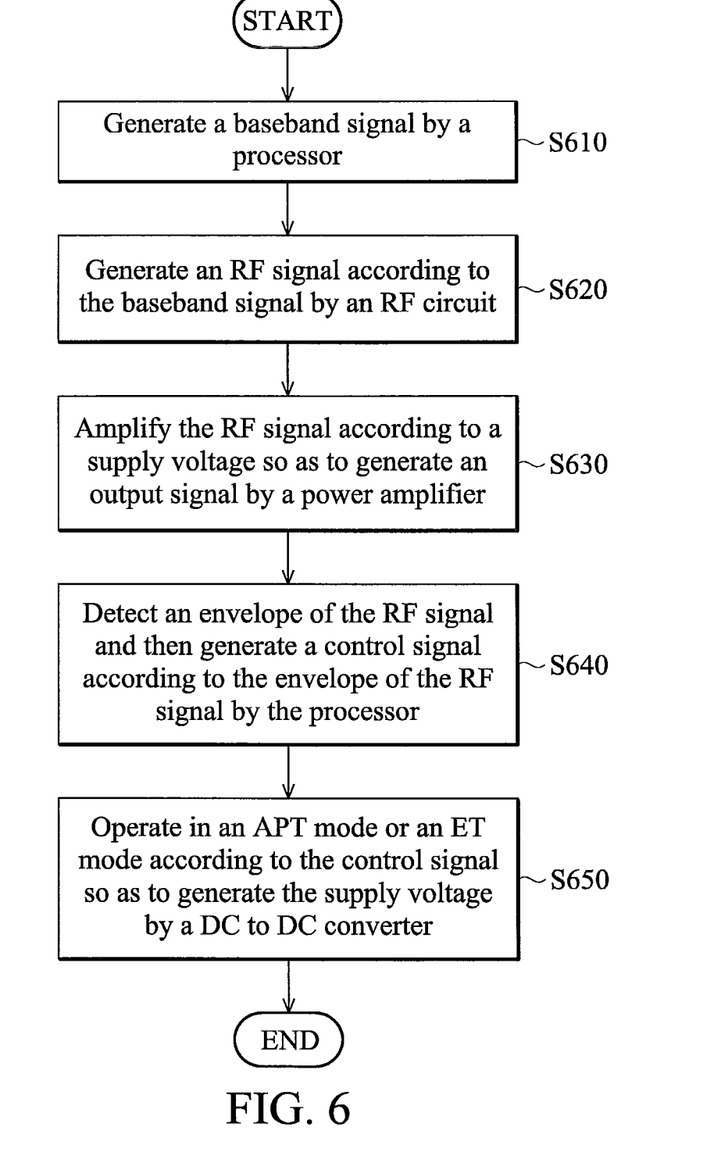
FIG. 6 is a flowchart for illustrating a method for power management according to an embodiment of the invention.

FIG. 6 is a flowchart for illustrating a method for power management according to an embodiment of the invention. To begin, in step S610, a baseband signal is generated by a processor. In step S620, an RF signal is generated according to the baseband signal by an RF circuit. In step S630, the RF signal is amplified according to a supply voltage by a power amplifier so that an output signal is generated. In step S640, an envelope of the RF signal is detected and then a control signal is generated according to the envelope of the RF signal by the processor. Finally, in step S650, a DC to DC converter operates in an APT mode or an ET mode according to the control signal so as to generate the supply voltage. Other detailed features of the method are similar to those of the apparatus for power management above.

Figure 7:
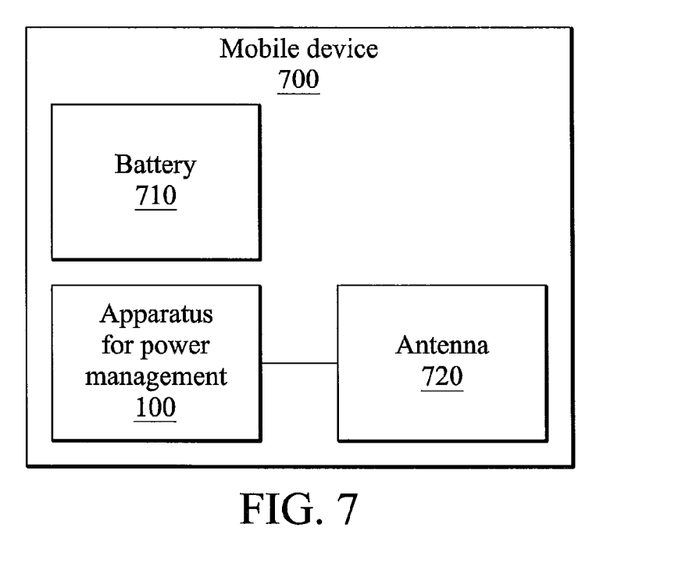
FIG. 7 is a diagram for illustrating a mobile device according to an embodiment of the invention.

FIG. 7 is a diagram for illustrating a mobile device 700 according to an embodiment of the invention. The mobile device may be a mobile phone, a notebook, or a tablet PC. As shown in FIG. 7, the mobile device 700 at least comprises a battery 710, an antenna 720, and the apparatus 100 for power management. The battery 710 can provide electrical power for the mobile device 700. The antenna 720 is electrically coupled to the apparatus 100 for power management, thereby transmitting an output signal generated by the apparatus 100 or receiving a wireless signal. The apparatus 100 for power management has internal components and functions as described above. Note that the apparatus 100 may be replaced with the apparatus 200 in FIG. 2 or the apparatus 400 in FIG. 4.

The invention provides the apparatus for power management and the mobile device that can switch between an APT mode and an ET mode automatically. This lets the mobile device save more electrical power, and increases usage time of the mobile device effectively.

The embodiments of the disclosure are considered as exemplary only, not limitations. It will be apparent to those skilled in the art that various modifications and variations can be made in the invention. The true scope of the disclosed embodiments being indicated by the following claims and their equivalents.

What is claimed is:

1. An apparatus for power management for use in a mobile device, comprising:
    a processor, generating a baseband signal;
    an RF (Radio Frequency) circuit, coupled to the processor, and generating an RF signal according to the baseband signal;
    a power amplifier, coupled to the RF circuit, and amplifying the RF signal according to a supply voltage so as to generate an output signal; and
    a DC to DC (Direct Current to Direct Current) converter, coupled between the processor and the power amplifier, and providing the supply voltage for the power amplifier,
    wherein:
    the processor is configured to detect an envelope of the RF signal, and to generate a control signal according to the envelope of the RF signal;
    the DC to DC converter operates in an APT (Average Power Tracking) mode or an ET (Envelope Tracking) mode according to the control signal so as to generate the supply voltage,
    wherein the processor is further configured to obtain output power of the output signal according to the envelope of the RF signal, and
    wherein if the output power is greater than a threshold value, the processor makes the DC to DC converter select the ET mode, and if the output power is less than or equal to the threshold value, the processor makes the DC to DC converter select the APT mode.

2. The apparatus as claimed in claim 1, further comprising:
    an envelope feedback circuit, wherein the processor receives the RF signal through the envelope feedback circuit.

3. The apparatus as claimed in claim 2, wherein the envelope feedback circuit is an attenuator.

4. The apparatus as claimed in claim 1, further comprising:
    a power management circuit, adjusting a function of each of the DC to DC converter and the power amplifier.

5. The apparatus as claimed in claim 1, wherein the processor is a modem IC (Integrated Circuit).

6. The apparatus as claimed in claim 1, wherein the DC to DC converter is an SMPS (Switch Mode Power Supply).

7. A method for power management for use in a mobile device, comprising the steps of:
    generating a baseband signal by a processor;
    generating an RF (Radio Frequency) signal according to the baseband signal by an RF circuit;
    amplifying the RF signal according to a supply voltage so as to generate an output signal by a power amplifier;
    detecting an envelope of the RF signal and then generating a control signal according to the envelope of the RF signal by the processor;
    operating in an APT (Average Power Tracking) mode or an ET (Envelope Tracking) mode according to the control signal so as to generate the supply voltage by a DC to DC (Direct Current to Direct Current) converter;
    obtaining output power of the output signal according to the envelope of the RF signal by the processor;
    if the output power is greater than a threshold value, making the DC to DC converter select the ET mode by the processor; and
    if the output power is less than or equal to the threshold value, making the DC to DC converter select the APT mode by the processor.

8. The method as claimed in claim 7, further comprising:
receiving the RF signal through an envelope feedback circuit by the processor.

9. The method as claimed in claim 8, further comprising:
attenuating the RF signal by the envelope feedback circuit.

10. The method as claimed in claim 7, further comprising:
adjusting a function of each of the DC to DC converter and the power amplifier by a power management circuit.

11. A mobile device, comprising:
    a battery, providing electrical power;
    an antenna; and
    an apparatus for power management, comprising:
        a processor, generating a baseband signal;
        an RF (Radio Frequency) circuit, coupled to the processor, and generating an RF signal according to the baseband signal;
        a power amplifier, coupled to the RF circuit, and amplifying the RF signal according to a supply voltage so as to generate an output signal; and
        a DC to DC (Direct Current to Direct Current) converter, coupled between the processor and the power amplifier, and providing the supply voltage for the power amplifier,
    wherein:
    the processor is configured to detect an envelope of the RF signal, and to generate a control signal according to the envelope of the RF signal;
    the DC to DC converter operates in an APT (Average Power Tracking) mode or an ET (Envelope Tracking) mode according to the control signal so as to generate the supply voltage;
    the antenna is coupled to the apparatus for power management so as to transmit the output signal,
    wherein the processor is further configured to obtain output power of the output signal according to the envelope of the RF signal, and
    wherein if the output power is greater than a threshold value, the processor makes the DC to DC converter select the ET mode, and if the output power is less than or equal to the threshold value, the processor makes the DC to DC converter select the APT mode.

12. The mobile device as claimed in claim 11, wherein the apparatus for power management further comprises:
    an envelope feedback circuit, wherein the processor receives the RF signal through the envelope feedback circuit.

13. The mobile device as claimed in claim 11, wherein the processor is a modem IC (Integrated Circuit).

14. The mobile device as claimed in claim 11, wherein the DC to DC converter is an SMPS (Switch Mode Power Supply).

* * * * *